United States Patent
Hong et al.

(10) Patent No.: US 7,761,679 B2
(45) Date of Patent: Jul. 20, 2010

(54) METHOD FOR RECOVERING FROM DOWNLOAD FAILURE OF PROGRAM AND PORTABLE TERMINAL EMPLOYING THE METHOD

(75) Inventors: Seong-Jun Hong, Seoul (KR); Jun-Hyun Kim, Gyeonggi-do (KR)

(73) Assignee: Pantech Co., Ltd., Seoul (KR)

( * ) Notice: Subject to any disclaimer, the term of this patent is extended or adjusted under 35 U.S.C. 154(b) by 289 days.

(21) Appl. No.: 11/295,892

(22) Filed: Dec. 6, 2005

(65) Prior Publication Data

US 2006/0156301 A1 Jul. 13, 2006

(30) Foreign Application Priority Data

Dec. 7, 2004 (KR) .................. 10-2004-0102665

(51) Int. Cl.
*G06F 12/00* (2006.01)
*G06F 13/00* (2006.01)
*G06F 13/28* (2006.01)

(52) U.S. Cl. ..................................... 711/165
(58) Field of Classification Search .................. 711/165
See application file for complete search history.

(56) References Cited

U.S. PATENT DOCUMENTS

| 6,073,124 A * | 6/2000 | Krishnan et al. ............. 705/59 |
| 6,584,559 B1 * | 6/2003 | Huh et al. ...................... 713/2 |
| 2003/0069008 A1 * | 4/2003 | Nakazawa et al. .......... 455/419 |
| 2004/0017708 A1 * | 1/2004 | Choi et al. ................. 365/200 |

FOREIGN PATENT DOCUMENTS

| KR | 1998-084234 | 12/1998 |
| KR | 10-2004-0056682 | 7/2004 |
| KR | 10-2004-0079113 A | 9/2004 |
| KR | 10-2004-0093745 | 11/2004 |

* cited by examiner

*Primary Examiner*—Matt Kim
*Assistant Examiner*—Christopher D Birkhimer
(74) *Attorney, Agent, or Firm*—H.C. Park & Associates, PLC

(57) ABSTRACT

A method for recovering from a download failure of program and a portable terminal employing the method is provided. The inventive method comprises the steps of reading, when the portable terminal is booting, a specific region of a NAND type memory and determining whether or not an emergency download is set in the specific region, if the emergency download is set, copying download-related data and variables from the NAND type memory to a random access memory (RAM), and setting a program counter at a zero address of the random access memory to thereby execute download-related code.

7 Claims, 3 Drawing Sheets

METHOD FOR RECOVERING FROM DOWNLOAD FAILURE OF PROGRAM AND PORTABLE TERMINAL EMPLOYING THE METHOD

CROSS-REFERENCE TO RELATED APPLICATION

The present application contains subject matter related to Korean patent application No. 10-2004-0102665, filed with the Korean Intellectual Property Office on Dec. 7, 2004, the entire contents of which are incorporated herein by reference.

FIELD OF THE INVENTION

The present invention relates to a portable terminal; and more particularly, to a method for recovering a download mode in the event of a download failure of various kinds of programs and a portable terminal employing the method.

DESCRIPTION OF RELATED ART

In portable terminals such as cellular phone, PCS (personal communication services) phone, IMT (International Mobile Telecommunication) phone, PDA (personal digital assistant) and the like, a demand for such supplementary functions as data communications, phone number database, schedule management, personal memo, broadcasting reception, moving image/music reproduction, etc., in addition to a basic voice call, has been increased in recent years. This demand increase leads to an increase in size of a control application program built in the portable terminal.

A memory currently used in the portable terminal is classified into a flash memory mounting thereon a control program for controlling operations and functions of the terminal and a random access memory (RAM) for executing the control program.

Typically, the flash memory employs an NAND type flash memory, which is low priced type and has a relatively simple structure to apply it to the portable terminal.

FIG. 1 is a schematic view showing storing regions of an NAND type memory in a conventional portable terminal Referring to FIG. 1, the NAND type memory generally comprises a read only data (RO) region for storing execution code, a read write data (RW) region for storing such variables as user data and so on, and a zero initiate data (ZI) region for storing initialization variables with zero value.

In the meantime, it is recent actual circumstances that various types of programs stored in the NAND flash memory are frequently upgraded. However, upon a download of software program, if such a download stops or fails due to unexpected circumstances in the portable terminal using the NAND flash memory, e.g., a reset of computer power, a down of operating system, a disconnection of cables, etc., a normal upgrade operation may not be executed.

In other words, for the download, the portable terminal using the NAND flash memory first makes all codes stored in the NAND flash memory copied to RAM upon a booting thereof, and then those codes executed starting from a zero address of RAM. In this process, however, if a download failure of software program is occurred, the copying process is not executed by a total length of the program, which causes the portable terminal to continue a rebooting operation.

SUMMARY OF THE INVENTION

It is, therefore, a primary object of the present invention to provide a method and apparatus for solving the problems of the prior art as mentioned above.

More specifically, the object of the invention is to provide a method for enabling a redownload execution if some specific blocks remain in a memory, even when a download failure of various types of programs and software is raised, and a portable terminal employing the method.

In accordance with one aspect of the present invention, there is provided a method for recovering from a download failure of program in a portable terminal, comprising the steps of: when the portable terminal is booting, reading a specific region of a flash memory and determining whether or not an emergency download is set in the specific region; if the emergency download is set, copying download-related data and variables from the flash memory to a random access memory; and setting a program counter at the specific address of the random access memory to thereby execute download-related code.

In accordance with another aspect of the present invention, there is provided a portable terminal, comprising: a flash memory for storing download-related codes in a first region, variables corresponding to the download-related code in a second region, and then general data and variables in a third region; and a controller for reading, when the portable terminal is booting, a specific region of a flash memory and judging whether or not an emergency download is set in the specific region, copying, if the emergency download is set, download-related data and variables from the flash memory to a random access memory, and setting a program counter at the specific address of the random access memory to thereby execute download-related code.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, a detailed description of a preferred embodiment of the present invention will be provided with reference to the accompanying drawings. In the following description of the invention, well-known functions or constructions will be not described in detail if they would obscure the gist of the invention in unnecessary detail.

Figure 1:
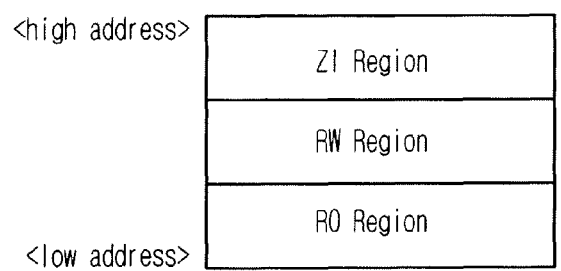
FIG. 1 is a schematic view showing storing regions of a NAND type memory in a conventional portable terminal.
Figure 2:
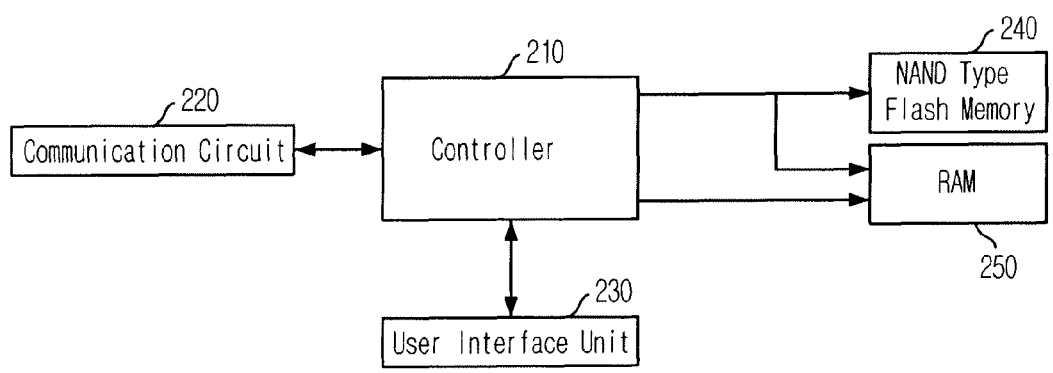
FIG. 2 is an exemplary block diagram illustrating a configuration of a portable terminal to which a method for recovering from a download failure of program in accordance with the present invention is applied.

FIG. 2 illustrates an exemplary block diagram showing a configuration of a portable terminal to which a method for recovering from a download failure of program in accordance with the present invention is applied.

Referring to FIG. 2, the portable terminal comprises a controller 210 for controlling the entire operation of the terminal, a communication circuit 220 for sending and receiving a high frequency signal via an antenna, and a user interface unit 230 for receiving an instruction of user and displaying a response thereto, through a key pad, voice, or screen.

In particular, included in a memory device of the portable terminal is a NAND type flash memory 240 that processes an instruction for access thereto under the control of the controller 210 and stores a call process program and control application program code that are necessary for the operation of the controller 210, font data for display, and user data, and a RAM 250 that provides regions to execute the control program.

In addition, although there is not shown in FIG. 2, an interface device may be further contained in the portable terminal to couple with external devices for upgrade's sake.

Figure 3:
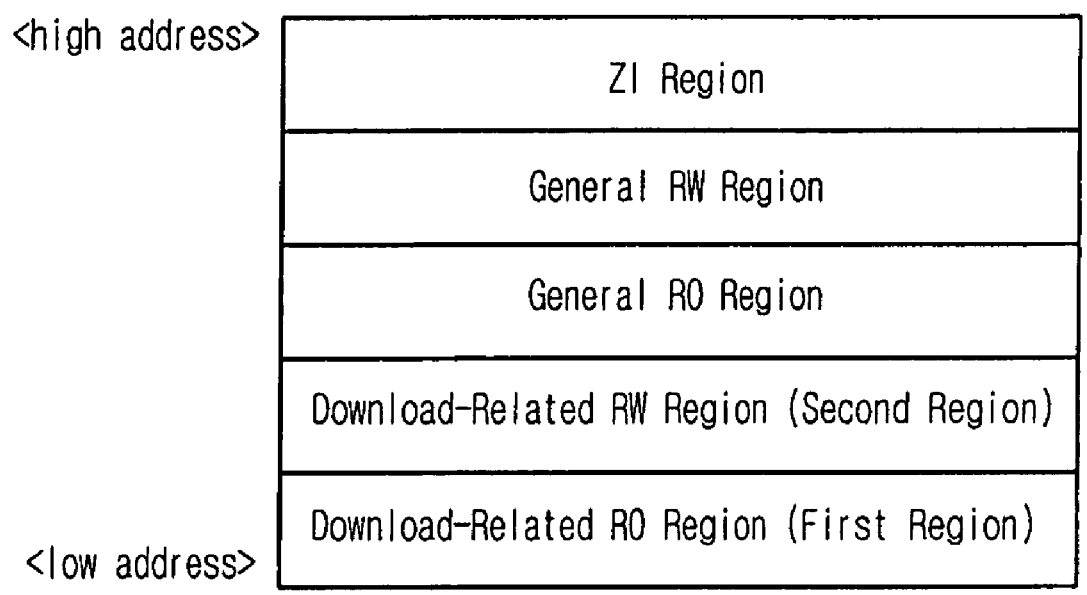
FIG. 3 is an exemplary view showing storing regions of the NAND type flash memory 240 shown in FIG. 2.

FIG. 3 is an exemplary view schematically showing storing regions of the NAND type flash memory 240 shown in FIG. 2.

Referring to FIG. 3, the NAND type flash memory 240 includes a memory map for executing an emergency download. Namely, to execute code to download desired software, execution code first has to be existed, and then corresponding variables have to be existed. Hence, if the execution code and corresponding variables are existed, an independent download can be executed. A fundamental principle of the present invention lies in that the execution code and variables associated with the download is placed in the beginning part of the binary, and then general execution code and variables that are not involved with the download are in a next part thereof. The execution code and variables associated with the download do not have large capacity; and, therefore, about 3 blocks are normally sufficient.

In FIG. 3, a first region is a download-related RO region for storing the execution code associated with the download, and a second region is a download-related RW region for storing the variables regarding the download. Further, placed in a next upper address region is a general RO region for storing execution code and control application execution code, etc., which are concerned with operating system and the like necessary for the operation of the controller 210. Placed in a subsequent upper address region is a general RW region for storing general variables. Lastly, initialization variables with zero value are stored in a ZI region. Since the variables with zero value are in the ZI region, the download-related ZI region needs not to be prepared separately.

Figure 4:
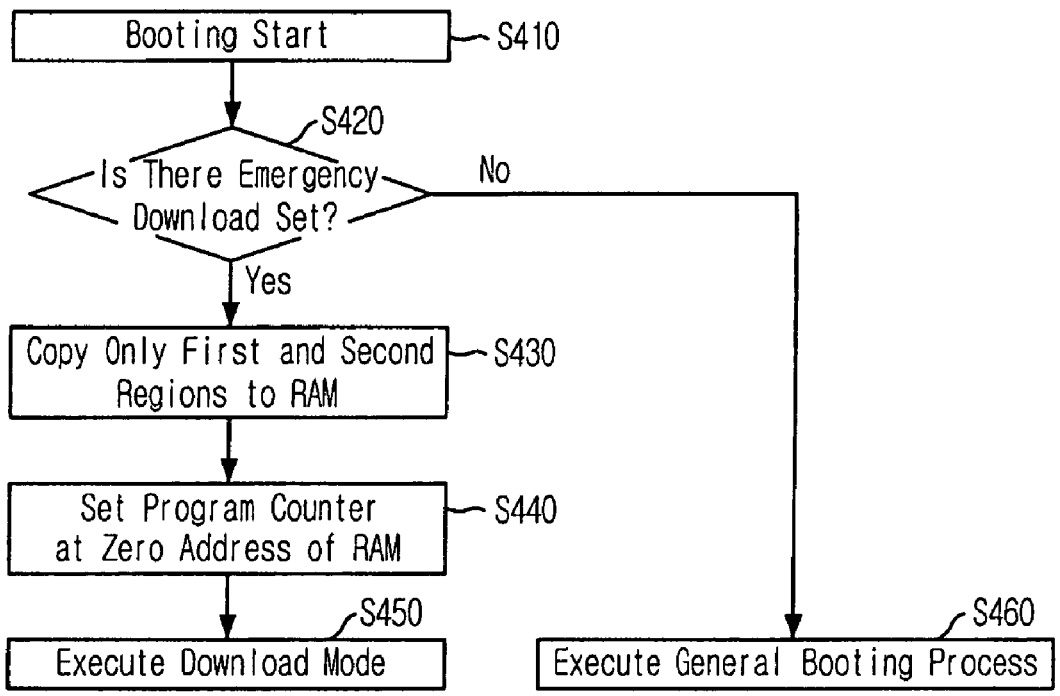
FIG. 4 is an exemplary flowchart showing the method for recovering from a download failure of program in accordance with the present invention.

FIG. 4 is an exemplary flowchart showing the method for recovering from a download failure of program in accordance with the present invention. Hereinafter, a control operation of a method for recovering from download failure of program in the portable terminal depicted in FIG. 2 will be described with reference to FIG. 4.

At step S410, if a power is applied and a system booting starts, the controller 210 judges at step S420 whether or not an emergency download is set. The term "emergency download" used herein means an operation for redownloading a desired program when a download of the program stops or fails due to unexpected circumstances, e.g., a reset of computer power, a down of operating system, a disconnection of cables, etc., during the download. The judgment at step S420 is done as follows. Firstly, a certain flag is set in a specific block of the NAND flash memory upon the download of the program. It is designed that the set flag variable is checked as a termination of the setting only if the download has normally been completed. And then, the controller 210 reads out, at step S420, the flag set in the specific region; and, if any value is set (implying the emergency download is set), it is judged that the download has not been completed normally. From the judgment at step S420, if the emergency download is set, the controller 210 prompts only the data stored in the first and the second regions of the NAND type flash memory 240 to be copied to the RAM 250 at step S430. At a next step S440, the controller 210 motivates a program counter to be set at a zero address of the RAM 250. At step S450, the controller 210 controls the terminal to be operated in a download mode by executing the download-related code, starting from the zero address of the RAM 250. Accordingly, in the even of download failure of program, the download of the program can be resumed.

In FIG. 4, step S460 is the stage of conducting a regular booting process when the emergency download is not set.

In accordance with the invention, the download-related execution code and variables generally occupy about 3-4 blocks which need very small area in the memory, while a total number of blocks therein is more than 2,000 blocks. Thus, the present invention can execute redownload, without a specific equipment such as JTAG (Joint Test Access Group), if some specific blocks remain even when a normal upgrade fails due to a stop of the terminal system or download failure by unexpected circumstances during the download of program or specific software.

The present application contains subject matter related to Korean patent application No. 10-2004-0102665, filed with the Korean Intellectual Property Office on Dec. 7, 2004, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A method for recovering from a download failure of a program in a portable terminal, comprising the steps of:
   arranging a download-related execution code in a first region of a flash memory, variables corresponding to the download-related execution code in a second region of the flash memory, and general execution code and variables not related to download in a third region of the flash memory;
   when the portable terminal is booting, reading the flash memory to determine whether an emergency download is set;
   if the emergency download is set, copying only the download-related execution code and the variables corresponding to the download-related execution code from the flash memory to a random access memory (RAM);
   setting a program counter at a specific address of the RAM to execute the download-related execution code; and
   operating the portable terminal in a downloading mode according to the download-related execution code and the variables corresponding to the download-related execution code.

2. The method as recited in claim 1, wherein the specific address of the RAM is a zero address of the RAM.

3. The method as recited in claim 1, wherein the flash memory is a NAND type memory.

4. The method as recited in claim 3, wherein a flag is set in a specific region of the NAND type memory upon a download of the program to indicate that the emergency download is set, and the flag is terminated when the download has been normally completed.

5. A portable terminal, comprising:
a flash memory to store download-related execution code in a first region, variables corresponding to the download-related execution code in a second region, and general execution code and variables not related to download in a third region; and
a controller to read, when the portable terminal is booting, a specific region of the flash memory and to determine whether an emergency download is set in the specific region, to copy, if the emergency download is set, only the download-related execution code and variables corresponding to the download-related execution code from the flash memory to a random access memory, to set a program counter at a specific address of the random access memory to execute the download-related execution code, and to operate the portable terminal in a download mode according to the download-related execution code and the variables corresponding to the download-related execution code.

6. The portable terminal as recited in claim 5, wherein the flash memory is a NAND type memory.

7. The portable terminal as recited in claim 5, wherein the specific address of the random access memory is a zero address of the random access memory.

* * * * *